United States Patent
Wu et al.

(12) 
(10) Patent No.: US 12,217,408 B2
(45) Date of Patent: Feb. 4, 2025

(54) SEMANTIC DEEP LEARNING AND RULE OPTIMIZATION FOR SURFACE CORROSION DETECTION AND EVALUATION

(71) Applicant: Bentley Systems, Incorporated, Exton, PA (US)

(72) Inventors: Zheng Yi Wu, Watertown, CT (US); Atiqur Rahman, Fremont, CA (US); Rony Kalfarisi, Singapore (SG)

(73) Assignee: Bentley Systems, Incorporated, Exton, PA (US)

( * ) Notice: Subject to any disclaimer, the term of this patent is extended or adjusted under 35 U.S.C. 154(b) by 500 days.

(21) Appl. No.: 17/572,806

(22) Filed: Jan. 11, 2022

(65) Prior Publication Data

US 2023/0222643 A1  Jul. 13, 2023

(51) Int. Cl.
  *G06T 7/00* (2017.01)
  *G06T 7/11* (2017.01)

(52) U.S. Cl.
  CPC .............. *G06T 7/0004* (2013.01); *G06T 7/11* (2017.01); *G06T 2200/24* (2013.01);
  (Continued)

(58) Field of Classification Search
  CPC ..... G06T 7/0004; G06T 7/11; G06T 2200/24; G06T 2207/10024; G06T 2207/20081; G06T 2207/20084; G06T 2207/20092; G06T 2207/30136; G06V 10/26; G06V 10/454
  See application file for complete search history.

(56) References Cited

U.S. PATENT DOCUMENTS 11,600,061 B1 *  3/2023  Jeong .................. G06V 20/17
2020/0175324 A1 *  6/2020  Takahashi ........... G06V 10/809
(Continued)

OTHER PUBLICATIONS

Abdelrazig, Yassir Abdalla, "Construction Quality assessment: A Hybrid Decision Support Model Using Image Processing and Neural Learning for Intelligent Defects Recognition," Thesis, Graduate School, Purdue University, UMI No. 9951909, May 1999, pp. 1-24.

(Continued)

*Primary Examiner* — Van D Huynh
(74) *Attorney, Agent, or Firm* — Cesari and McKenna, LLP; James A. Blanchette

(57) ABSTRACT

In various example embodiments, techniques are provided for training and/or using a semantic deep learning model, such as a segmentation-enabled CNN model, to detect corrosion and enable its quantitative evaluation. An application may include a training dataset generation tool capable of semi-automatic generation of a training dataset that includes images with labeled corrosion segments. The application may use the labeled training dataset to train a semantic deep learning model to detect and segment corrosion in images of an input dataset at the pixel-level. The application may apply an input dataset to the trained semantic deep learning model to produce a semantically segmented output dataset that includes labeled corrosion segments. The application may include an evaluation tool that quantitatively evaluates corrosion in the semantically segmented output dataset, to allow severity of the corrosion to be classified.

20 Claims, 13 Drawing Sheets

(52) U.S. Cl.
CPC ............... *G06T 2207/10024* (2013.01); *G06T 2207/20081* (2013.01); *G06T 2207/20084* (2013.01); *G06T 2207/20092* (2013.01); *G06T 2207/30136* (2013.01)

(56) References Cited

U.S. PATENT DOCUMENTS

| | | | | |
|---|---|---|---|---|
| 2020/0175352 | A1* | 6/2020 | Cha | G06N 3/04 |
| 2020/0355601 | A1* | 11/2020 | Amer | G06N 3/044 |
| 2022/0036132 | A1* | 2/2022 | Oruganty | G06N 3/045 |
| 2022/0058809 | A1* | 2/2022 | Fuchs | G06V 10/751 |
| 2022/0262104 | A1* | 8/2022 | Salman | G06V 10/82 |
| 2023/0003663 | A1* | 1/2023 | Horita | G06V 10/25 |
| 2023/0003687 | A1* | 1/2023 | Vaganay | F17C 13/12 |

OTHER PUBLICATIONS

Alkanhal, Tawfeeq A., "Image Processing Techniques Applied for Pitting Corrosion Analysis," IJRET: International Journal of Research in Engineering and Technology, vol. 3, Issue 1, Jan. 2014, pp. 385-391.

Atha, Deegan, et al., "Evaluation of Deep Learning Approaches Based on Convolutional Neural Networks for Corrosion Detection," Structural Health Monitoring, SHM, vol. 17, No. 5, Nov. 6, 2017, pp. 1110-1128.

Badrinarayanan, Vijay, et al., "SegNet: A Deep Convolutional Encoder-Decoder Architecture for Image Segmentation," IEEE, IEEE Transactions on Pattern Analysis and Machine Intelligence, vol. 39, No. 12, Dec. 2017, pp. 2481-2495.

Bonnin-Pascual, Francisco, et al., "Corrosion Detection for Automated Visual Inspection," InTechOpen, Chapter, Feb. 2014, pp. 1-13.

Castrejón, Lluis, et al., "Annotating Object Instances with a Polygon-RNN," arXiv, arXiv:1704.05548v1 [cs.CV], Apr. 18, 2017, pp. 1-9.

Chen, Liang-Chieh, et al., "DeepLab: Semantic Image Segmentation with Deep Convolutional Nets, Atrous Convolution, and Fully Connected CRFs," IEEE, IEEE Transactions on Pattern Analysis and Machine Intelligence, vol. 40, No. 4, Apr. 2018, pp. 834-848.

Chen, Po-Han, et al., "Artificial Intelligence Application to Bridge Painting Assessment," Elsevier Science B.V., Elsevier, Automation in Construction, vol. 12, Issue 4, Jul. 2003, pp. 431-445.

Chen, Po-Han, et al., "Automated Bridge Coating Defect Recognition Using Adaptive Ellipse Approach," Elsevier B.V., Elsevier, Science Direct, Automation in Construction, vol. 18, Issue 5, Aug. 2009, pp. 632-643.

Chen, Xianjie, et al., "Detect What You Can: Detecting and Representing Objects Using Holistic Models and Body Parts," arXiv, arXiv:1406.2031v1 [cs.CV], Jun. 8, 2014, pp. 1-8.

Choi, K. Y., et al., "Morphological Analysis and Classification of Types of Surface Corrosion Damage by Digital Image Processing," Elsevier Ltd., Elsevier, Science Direct, Corrosion Science, vol. 47, Jul. 2, 2004, pp. 1-15.

Cordts, Marius, et al., "The Cityscapes Dataset for Semantic Urban Scene Understanding," IEEE, IEEE Computer Society, 2016 IEEE Conference on Computer Vision Pattern Recognition (CVPR), Las Vegas, NV, USA, Jun. 27-30, 2016, pp. 3213-3223.

Duy, Le Dinh, et al., "Deep Learning in Semantic Segmentation of Rust in Images," ACM, Inc., ACM, ICSCA 2020: Proceedings of the 2020 9th International Conference on Software and Computer Applications, Feb. 2020, pp. 1-4.

Enikeev, Marat, et al., "Analysis of Corrosion Process Development on Metals by Means of Computer Vision," Engineering Journal, vol. 21, Issue 4, Jul. 31, 2017, pp. 183-192.

Everingham, Mark, et al., "The PASCAL Visual Object Classes Challenge: A Retrospective," Springer Science+Business Media New York, Springer, International Journal of Computer Vision, vol. 111, Jun. 25, 2014, pp. 98-136.

Farabet, Clement, et al., "Learning Hierarchical Features for Scene Labeling," IEEE, IEEE Computer Society, IEEE Transactions on Pattern Analysis and Machine Intelligence, vol. 35, No. 8, Aug. 2013, pp. 1915-1929.

Forkan, Abdur Rahim Mohammad, et al., "CorrDetector: A Framework for Structural Corrosion Detection from Drone Images Using Ensemble Deep Learning," arXiv, arXiv:2102.04686v1 [cs.CV], Feb. 9, 2021, pp. 1-26.

Fulkerson, Brian, et al., "Class Segmentation and Object Localization with Superpixel Neighborhoods," IEEE, 2009 IEEE 12$^{th}$ International Conference on Computer Vision (ICCV), Kyoto, Japan, Sep. 29-Oct. 2, 2009, pp. 670-677.

Furuta, Hitoshi, et al., "Neural Network Analysis of Structural Damage Due to Corrosion," IEEE, Proceedings of 3rd International Symposium on Uncertainty Modeling and Analysis and Annual Conference of the North American Fuzzy Information Processing Society, Proceedings of ISUMA-NFIPS '95, College Park, MD, USA, Sep. 17-20, 1995, pp. 109-114.

Ghanta, Sindhu, et al., "Wavelet Domain Detection of Rust in Steel Bridge Images," IEEE, 2011 IEEE International Conference on Acoustics, Speech and Signal Processing (ICASSP), Prague, Czech Republic, May 22-27, 2011, pp. 1033-1036.

He, Kaiming, et al., "Mask R-CNN," IEEE, IEEE Computer Society, 2017 IEEE International Conference on Computer Vision (ICCV), Venice, Italy, Oct. 22-29, 2017, pp. 2980-2988.

Hoskere, V., et al., "Vision-Based Structural Inspection Using Multiscale Deep Convolutional Neural Networks," 3$^{rd}$ Huixian Intellectual Forum on Earthquake Engineering for Young Researchers, University of Illinois, Urbana-Champaign, United States, Aug. 11-12, 2017, pp. 1-8.

"InspectTech: Inspection, Maintenance, and Asset Management for Transportation Infrastructure: Bridge, Tunnel, Road, Rail, and Transit," Bentley, Bentley Systems, Incorporated, Product Data Sheet, Nov. 2014, pp. 1-2.

Jahanshahi, Mohammad R., "Parametric Performance Evaluation of Wavelet-Based Corrosion Detection Algorithms for Condition Assessment of Civil Infrastructure Systems," American Society of Civil Engineers, ASCE, Journal of Computing in Civil Engineering, vol. 27, No. 4, Jul. 1, 2013, pp. 345-357.

Kalfarisi, Rony, et al., "Crack Detection and Segmentation Using Deep Learning with 3D Mesh Model for Quantitative Assessment and Integrated Visualization," American Society of Civil Engineers, ASCE, Journal of Computing in Civil Engineering, vol. 34, No. 3, May 1, 2020, pp. 345-357.

Koch, Gerhardus H., et al., "Corrosion Costs and Preventive Strategies in the United States," NACE International, CC Technologies Laboratories, Incorporated, Federal Highway Administration, Publication No. FHWA-RD-01-156, Mar. 1, 2002, pp. 1-12.

Lecun, Yann, et al., "Gradient-Based learning Applied to Document Recognition," IEEE, Proceedings of the IEEE, vol. 86, No. 11, Nov. 1998, pp. 2278-2324.

Lee, S., et al., "Performance Comparison of Bridge Coating Defect Recognition Methods," NACE International, Corrosion, Corrosion Science Section, Jan. 2005, pp. 12-20.

Lee, Sangwook, et al., "Automated Recognition of Surface Defects Using Digital Color Image Processing," Elsevier B.V., Elsevier, Automation in Construction, vol. 15, Issue 4, Jul. 2006, pp. 540-549.

Lim, Hyung Jin, et al., "Steel Bridge Corrosion Inspection with Combined Vision and Thermographic," Structural Health Monitoring, SHM, vol. 20, No. 6, Feb. 11, 2021, pp. 3424-3435.

Lin, Tsung-Yi, et al., "Feature Pyramid Networks for Object Detection," CVF, Computer Vision Foundation, Proceedings of the IEEE Conference on Computer Vision and Pattern Recognition (CVPR), Honolulu, HI, USA, Jul. 21-26, 2017, pp. 2117-2125.

Ling, Huan, et al., "Fast Interactive Object Annotation with Curve-GCN," CVF, Computer Vision Foundation, Proceedings of the IEEE/CVF Conference on Computer Vision and Pattern Recognition (CVPR), Long Beach, CA, USA, Jun. 16-20, 2019, pp. 5257-5266.

Liu, Wei, et al., "ParseNet: Looking Wider to See Better," arXiv, arXiv:1506.04579v2 [cs.CV], Conference Paper, Nov. 19, 2015, pp. 1-11.

(56) References Cited

OTHER PUBLICATIONS

Maninis, K.-K., et al., "Deep Extreme Cut: From Extreme Points to Object Segmentation," IEEE, IEEE Computer Society, 2018 IEEE/CVF Conference on Computer Vision and Pattern Recognition, Salt Lake City, UT, USA, Jun. 18-23, 2018, pp. 616-625.

Mottaghi, Roozbeh, et al., "The Role of Context for Object Detection and Semantic Segmentation in the Wild," IEEE, IEEE Computer Society, 2014 IEEE Conference on Computer Vision and Pattern Recognition, Columbus, OH, USA, Jun. 23-28, 2014, pp. 891-898.

Nash, Will, et al., "Quantity Beats Quality for Semantic Segmentation of Corrosion in Images," arXiv, arXiv:1807.03138v1 [cs.CV], Jun. 30, 2018, pp. 1-10.

Noh, Hyeonwoo, et al., "Learning Deconvolution Network for Semantic Segmentation," arXiv, arXiv:1505.04366v1 [cs.CV], May 17, 2015, pp. 1-10.

Petricca, Luca, et al., "Corrosion Detection Using A.I.: A Comparison of Standard Computer Vision Techniques and Deep Learning Model," Proceedings of the Sixth International Conference on Computer Science, Engineering and Information Technology, CS & IT-CSCP, Computer Science & Information Technology (CS & IT), May 21, 2016, pp. 91-99.

Pidaparti, Ramana M., et al., "Classification of Corrosion Defects in NiAl Bronze Through Image Analysis," Elsevier Ltd., Elsevier, Science Direct, Corrosion Science, vol. 52, Jul. 13, 2010, pp. 3661-3666.

Ronneberger, Olaf, et al., "U-Net: Convolutional Networks for Biomedical Image Segmentation," arXiv, arXiv:1505.04597v1 [cs.CV], May 18, 2015, pp. 1-8.

Russakovsky, Olga, et al., "ImageNet Large Scale Visual Recognition Challenge," arXiv, arXiv: 1409.0575v3 [cs.CV], Jan. 30, 2015, pp. 1-43.

Simonyan, Karen, et al., "Very Deep Convolutional Networks for Large-Scale Image Recognition," arXiv, arXiv:1409.1556v6 [cs.CV], Conference Paper, ICLR 2015, Apr. 10, 2015, pp. 1-14.

Shotton, Jamie, et al., "Semantic Texton Forests for Image Categorization and Segmentation," IEEE, 2008 IEEE Conference on Computer Vision and Pattern Recognition, Anchorage, AK, USA, Jun. 23-28, 2008, pp. 1-8.

Shotton, Jamie, et al., "TextonBoost for Image Understanding: Multi-Class Object Recognition and Segmentation by Jointly Modeling Texture, Layout, and Context," Jul. 2, 2007, pp. 1-30.

Tu, Zhuowen, et al., "Auto-Context and Its Application to High-Level Vision Tasks and 3D Brain Image Segmentation," IEEE, IEEE Computer Society, IEEE Transactions on Pattern Analysis and Machine Intelligence, vol. 32, No. 10, Oct. 2010, pp. 1744-1757.

Wu, Z. Y., et al., "Darwin Optimization User Manual," Darwin Optimization, Applied Research, Bentley, Bentley Systems, Incorporated, Sep. 12, 2012, pp. 1-20.

Yuan, Jiangye, et al., "Factorization-Based Texture Segmentation," IEEE, IEEE Transactions on Image Processing, vol. 24, No. 11, Nov. 2015, pp. 3488-3497.

Zeiler, Matthew, et al., "Visualizing and Understanding Convolutional Networks," Springer International Publishing Switzerland, 13th European Conference, Zurich, Switzerland, Proceedings, Part I, European Conference on Computer Vision, Computer Vision—ECCV 2014, Part I, Lecture Notes in Computer Science, LNCS 8689, vol. 8689, Springer, Cham, 2014, Sep. 6-12, 2014, pp. 818-833.

Zhao, Hengshuang, et al., "Pyramid Scene Parsing Network," CVF, Computer Vision Foundation, Proceedings of the IEEE Conference on Computer Vision and Pattern Recognition (CVPR), Honolulu, HI, USA, Jul. 21-26, 2017, pp. 2881-2890.

\* cited by examiner

SEMANTIC DEEP LEARNING AND RULE OPTIMIZATION FOR SURFACE CORROSION DETECTION AND EVALUATION

BACKGROUND

Technical Field

The present disclosure relates generally to machine learning and more specifically to techniques for training and/or using a semantic deep learning model to detect surface corrosion and enable its quantitative evaluation.

Background Information

Corrosion is a common phenomenon involving the deterioration of a metal by chemical reaction with the environment. If not detected and mitigated early, it may cause dangerous and expensive damage to various types of infrastructure (e.g., bridges, pipelines, rail networks, tank farms, industrial plants, etc.). A 2016 study by the National Association of Corrosion Engineering showed that the total yearly cost of damage due to corrosion of infrastructure in the United States was as high as $22.6 billion dollars. In order to lower this huge cost there is an urgent need for techniques that can effectively and efficiently detect corrosion, and enable its quantitative evaluation, so that mitigation strategies can be deployed.

Although some corrosion occurs on subsurface metal portions of infrastructure (for example, the steel refinements used inside prestressed concrete in bridges), a large amount of corrosion occurs on exposed metal surfaces. For instance, significant corrosion often occurs on the surface of steel beams used in bridges, steel pipes used in pipelines, steel rails of railroad tracks, sheet metal of storage tanks, etc.

Traditionally, surface corrosion is detected by engineers performing in-person field inspections or taking photographs and/or videos and subsequently manually reviewing the images. Typically, there is a large number of images and manual review takes significant time. Further, it usually is highly subjective and lacks effective quantification (e.g., one engineer may consider an area to include a significant amount of corrosion, while another engineer looking at the same area may not).

It would be desirable to develop automatic techniques that could effectively and efficiently detect surface corrosion, and enable its quantitative evaluation. However, this has posed a number of technical challenges. Surface corrosion generally has two main visually characteristics: a rough surface texture and a well-defined red color spectrum. A number of machine learning techniques have been applied to attempt to detect surface corrosion using one or both of these visual characteristics. A group of early machine learning approaches may be referred to generally as "feature-based techniques". Such feature-based techniques typically require manual efforts to construct features, or required some other prior knowledge about them. A group of more recent machine learning approaches may be referred to generally as "convolutional neural network (CNN)-based techniques." These traditional CNN-based techniques represent a significant advance over feature-based techniques. However, traditional CNN-based techniques still suffer a number of shortcomings that have limited their widespread adoption and deployment for detecting surface corrosion.

First, traditional CNN-based techniques typically require a training dataset to be manually prepared. For example, an engineer may be required to review a large number (e.g., hundreds) of images for corrosion, and manually label areas of corrosion in the images to create a labeled training dataset. This may be an extremely time consuming process. Second, traditional CNN-based techniques typically are limited to detecting corrosion in regular bounding boxes (e.g., rectangular bounding boxes), without precisely segmenting the corrosion into irregular areas at the pixel-level. For example, a regular bounding box (e.g., a rectangular bounding box) may be identified that encompasses an irregular area of corrosion as well a non-corroded area, without differentiating between corrosion and non-corrosion pixels. Third, existing CNN-based techniques typically do not automatically quantitatively evaluate corrosion to allow its severity to be assessed.

Accordingly, there is an unmet need for techniques that can effectively and efficiently detect surface corrosion, and enable its quantitative evaluation, so that mitigation strategies can be deployed.

SUMMARY

In various example embodiments, techniques are provided for training and/or using a semantic deep learning model, such as a segmentation-enabled CNN model, to detect surface corrosion and enable its quantitative evaluation.

An application may include a training dataset generation tool capable of semi-automatic generation of a training dataset that includes images with labeled corrosion segments. Semi-automatic training dataset generation may consume significantly less user (e.g., engineer) time than manual generation. In operation, the training dataset generation tool may apply an unsupervised image segmentation algorithm (e.g., a factor-based texture segmentation (FSEG) algorithm) to segment a first portion (e.g., a small portion) of the images (e.g., red-green-blue (RGB) images) of the training dataset. The segmentation results for the first portion (e.g., the small portion) may be shown in a segment labeling interface to the user, who is prompted to manually label corrosion segments therein. The training dataset generation tool may then optimize classification rules (e.g., RGB color channel-based rules) based on the labeled images of the first portion to produce a rule-based classifier (e.g., a RGB color channel-based classifier). The training dataset generation tool may then apply the rule-based classifier to a second portion (e.g., a large remaining portion) of the images of the training dataset to automatically segment and classify them, avoiding manual labeling for this second portion.

The application may use the labeled training dataset (e.g., the small portion and the large portion) to train a semantic deep learning model (e.g., a semantic segmentation-enabled CNN model) to detect and segment corrosion in images of an input dataset at the pixel-level. By semantically segmenting at the pixel level, irregular areas of corrosion may be precisely identified. The application may train the semantic deep learning model to perform such task by minimizing a total loss function that weights together misclassification of corrosion pixels and misclassification of non-corrosion pixels.

The application may apply an input dataset to the trained semantic deep learning model to produce a semantically segmented output dataset that includes labeled corrosion segments. The application may include an evaluation tool that quantitatively evaluates corrosion in the semantically segmented output dataset. The evaluation tool may convert images of the output dataset to grayscale and calculate a degree of corrosion index for each corrosion segment based on the mean grayscale value of pixels within its area. The evaluation tool may further divide corrosion segments into categories (e.g., light, medium and heavy corrosion categories) based on a comparison of the degree of corrosion index to one or more thresholds (e.g., maximum and/or minimum thresholds). The application may provide (e.g., display in a user interface to the user (e.g., the engineer), save to memory/storage, etc.) indications of corrosion segments in the images of the output dataset, their degree of corrosion index, their category and/or other information.

In one example embodiment, a method is provided for training and/or using a semantic deep learning model to detect corrosion. A training dataset generation tool of an application executing on one or more computing devices receives a training dataset that includes a plurality of images of infrastructure having at least some surface corrosion. The training dataset generation tool applies an unsupervised image segmentation algorithm to segment a first portion of the images of the training dataset. A user is prompted to manually label at least some of the segments of the first portion as corrosion segments that include surface corrosion to produce labeled images. The training dataset generation tool optimizes classification rules based on the labeled images of the first portion to produce a rule-based classifier. The training dataset generation tool then applies the rule-based classifier to a second portion of the images of the training dataset to automatically segment and label at least some of the segments of the second portion as corrosion segments. The labeled training dataset is used to train the semantic deep learning model to detect and segment corrosion in images of an input dataset.

In another example embodiment, a method is provided for training and/or using a semantic deep learning model to detect corrosion. An application executing on one or more computing devices trains a semantic deep learning model to detect and segment corrosion in images of an input dataset. An input dataset that includes a plurality of images of infrastructure is applied to the trained semantic deep learning model to produce a semantically segmented output dataset, the semantically segmented output dataset including labeled corrosion segments. A degree of corrosion index is calculated for each corrosion segment based on a mean grayscale value of pixels within its area. The application displays in a user interface or stores to memory/storage the degree of corrosion index of each corrosion segment.

In yet another example embodiment, an electronic device readable medium is provided having instructions stored thereon that when executed on one or more processors of one or more electronic devices are operable to perform operations. These operations may include receiving a training dataset that includes a plurality of images of infrastructure having at least some surface corrosion, applying an image segmentation algorithm to segment a first portion of the images of the training dataset, receiving user-provided labels for at least some of the segments of the first portion to produce labeled images, and optimizing classification rules based on the labeled images of the first portion to produce a rule-based classifier. These operations may further include applying the rule-based classifier to a second portion of the images of the training dataset to automatically segment and label at least some of the segments of the second portion, and using the labeled training dataset to train a semantic deep learning model to detect and segment corrosion in images of an input dataset.

It should be understood that a variety of additional features and alternative embodiments may be implemented other than those example embodiments discussed in this Summary. This Summary is intended simply as a brief introduction to the reader for the further description which follows and does not indicate or imply that the example embodiments mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 1A:
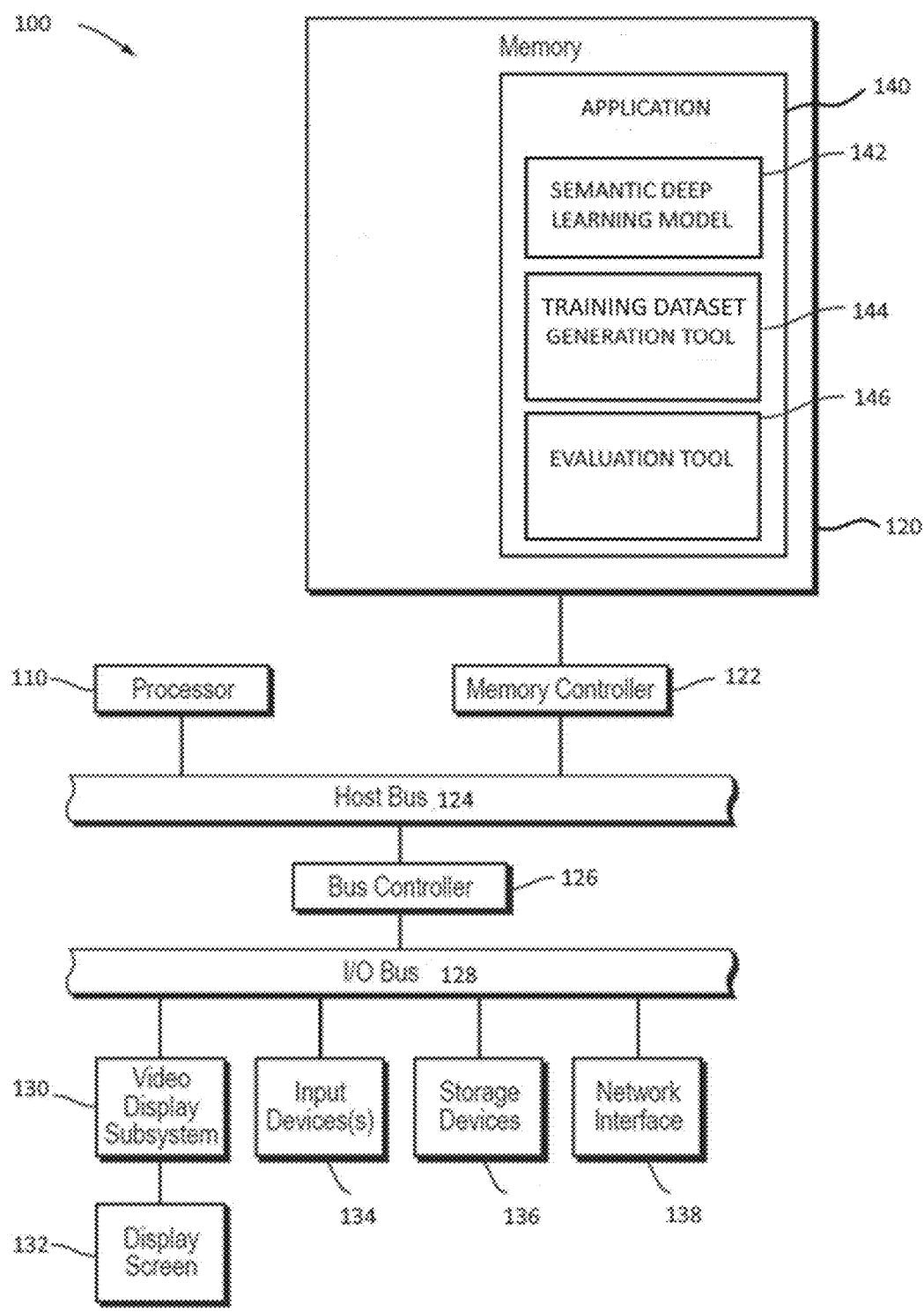
FIG. 1A is a block diagram of an example computing device that may be used with the present techniques.

FIG. 1A is a block diagram of an example computing device 100 that may be used with the present techniques. The computing device 100 includes at least one processor 110 coupled to a host bus 124. The processor 110 may be any of a variety of commercially available processors. A memory 120, such as a Random-Access Memory (RAM), is also coupled to the host bus 124 via a memory controller 122. When in operation, the memory 120 stores executable instructions and data that are provided to the processor 110. An input/output (I/O) bus 128 is accessible to the host bust 124 via a bus controller 126. A variety of additional components are coupled to the I/O bus 128. For example, a video display subsystem 130 is coupled to the I/O bus 128. The video display subsystem 130 may include a display screen 132 and hardware to drive the display screen. At least one input device 134, such as a keyboard, a touch sensor, a touchpad, a mouse, etc., is also coupled to the I/O bus 128. Storage device(s) 136, such as a hard disk drive, a solid-state drive, or other type of persistent data store, are further attached, and may persistently store the executable instructions and data, which are loaded into the memory 120 when needed. Still further, a network interface 138 is coupled to the I/O bus 128. The network interface 138 enables communication over a computer network, such as the Internet, between the computing device 100 and other devices, using any of a number of well-known networking protocols. Such communication may enable collaborative, distributed, or remote computing with functionality spread across multiple devices.

Working together the components of the computing device 100 (and other devices in the case of collaborative, distributed, or remote computing) may execute instructions for a software application 140 that is capable of training and/or using a semantic deep learning model 142 (e.g., a segmentation-enabled CNN model) to detect surface corrosion and enable its quantitative evaluation. The application 140 may include a number of modules and tools, such as a training dataset generation tool 144 capable of semi-automatic generation of a training dataset and an evaluation tool 146 capable of quantitatively evaluating corrosion detected in an input dataset, among other modules and tools.

Figure 1B:
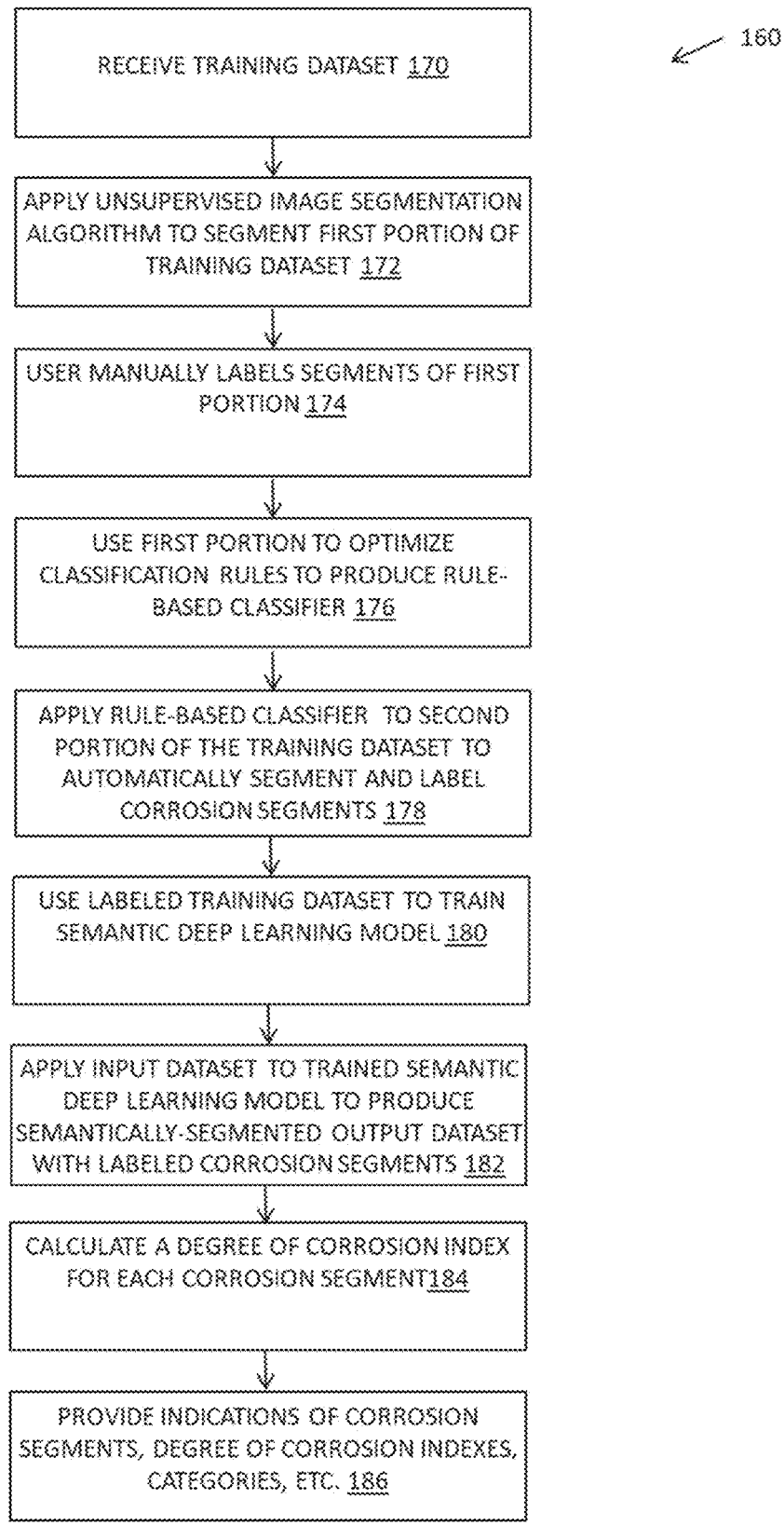
FIG. 1B is a high-level flow diagram of an example sequence of steps that may be executed by an application to train a semantic deep learning model (e.g., a segmentation-enabled CNN model) to detect corrosion.

FIG. 1B is a high-level flow diagram of an example sequence of steps 160 that may be executed by the application 140 to train a semantic deep learning model 142 (e.g., a segmentation-enabled CNN model) to detect corrosion. At step 170, the training dataset generation tool 144 receives a training dataset that includes a plurality of images (e.g., about 10,000 RGB digital photographs) of infrastructure having at least some surface corrosion. The images of the training dataset may have been captured by a camera of a handheld mobile device, a camera of an unmanned aerial vehicle (UAV) and/or another device. The collection may be facilitated by collection software executing on such device. In one example implementation, the collection software may be the InspectTech™ Collector Mobile software available from Bentley Systems, Incorporated.

Manually labeling corrosion segments in images of a training dataset, for example pixel-by-pixel, is usually a tedious and time-consuming task. To improve the efficiency of data labeling the training dataset generation tool 144 may provide for semi-automatic generation of a training dataset with labeled corrosion segments. The images of the training dataset may be divided into two portions: a first portion (e.g., a small portion, such as about 100 images) and a second portion (e.g., a large portion, such as about 9,900 images). At step 172, the training dataset generation tool 144 applies an unsupervised image segmentation algorithm to segment the first portion of the training dataset. In one implementation, the unsupervised image segmentation algorithm is a factor-based texture segmentation (FSEG) algorithm.

Figure 2A:
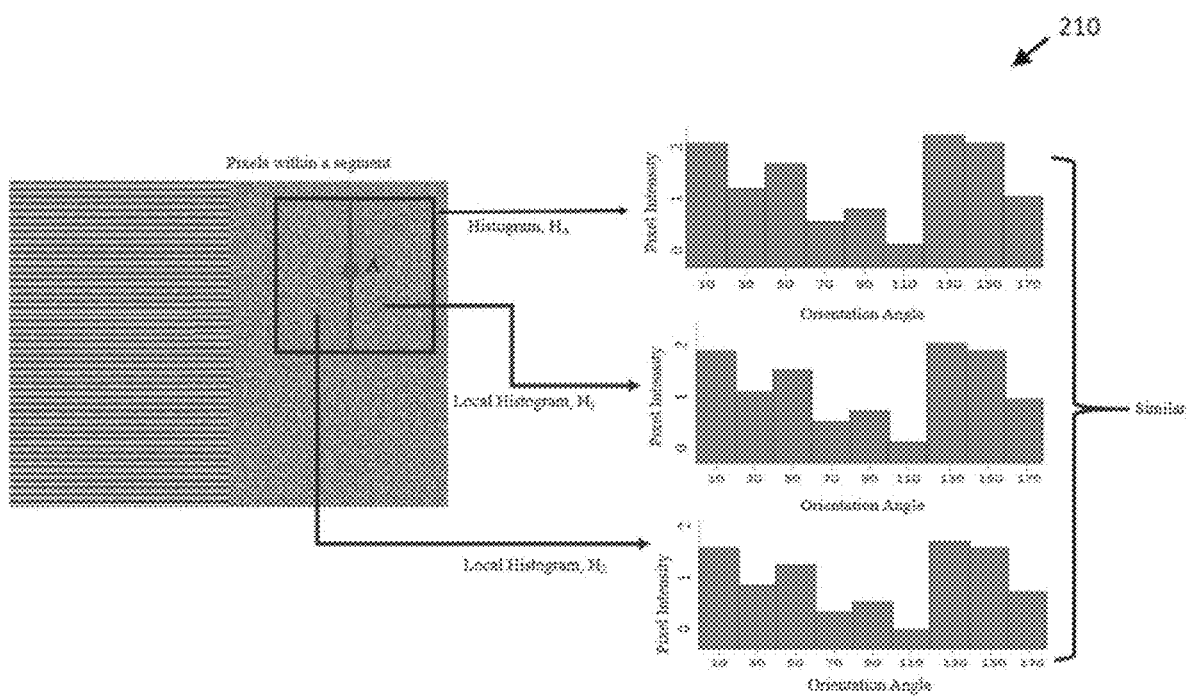
FIG. 2A is an illustration of a FSEG algorithm identifying a pixel within a segment.
Figure 2B:
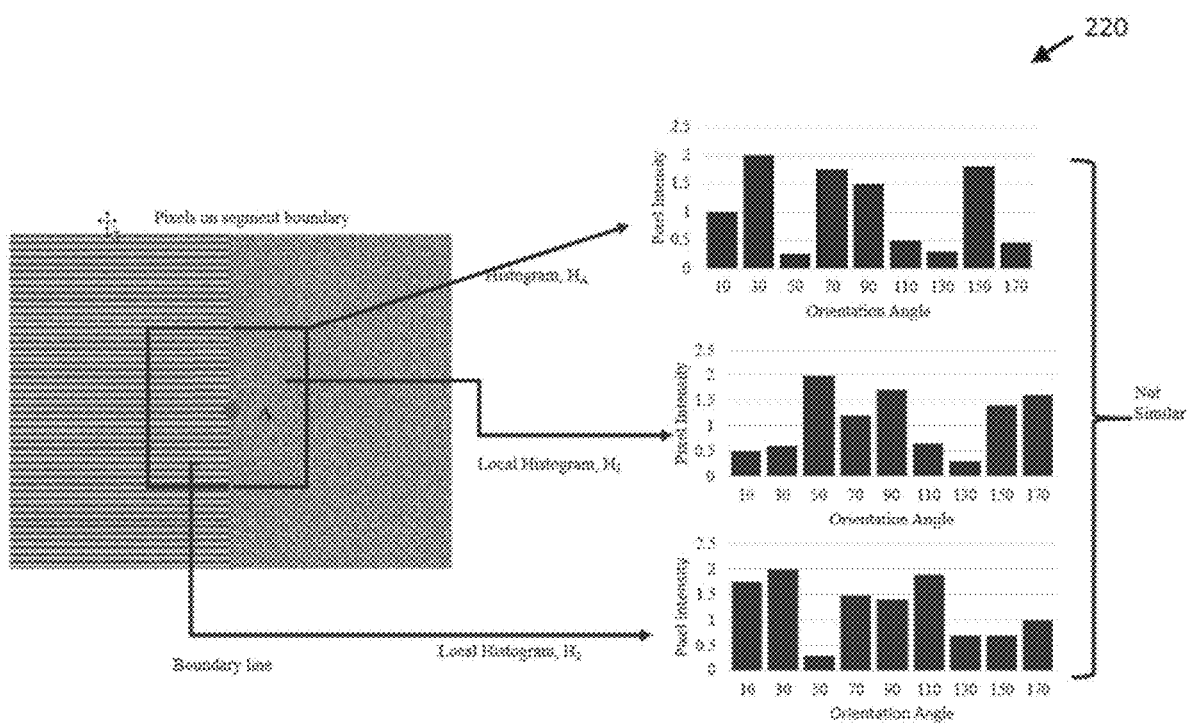
FIG. 2B is an illustration of a FSEG algorithm identifying a pixel on a segment boundary.

With FSEG, local spectral histograms may be used as features. The algorithm may detect segment boundaries by computing and comparing for each pixel in an image histograms of pixel intensity on different orientation angles. FIG. 2A is an illustration 210 of the FSEG algorithm identifying a pixel within a segment. Example pixel A in FIG. 2A not on the boundary of a segment. The FSEG algorithm considers a window around pixel A and computes a histogram within the window. It then divides the window into two parts through pixel A and computes histograms in the two parts. Because pixel A is not on a boundary line of a segment, it will give very similar histograms for all three windows. FIG. 2B is an illustration 220 of the FSEG algorithm identifying a pixel on a segment boundary. Now, example pixel A in on the boundary of a segment. The FSEG algorithm again computes a histogram within a window around pixel A, divides that window into two parts through pixel A, and computes histograms in the two parts. Because pixel A is on a boundary of a segment, the histograms for all three windows will be significantly different.

The FSEG algorithm may utilize a number of parameters, that may be set by the training dataset generation tool 144. A window size parameter may control how smooth the segment boundary is formed, with a smaller window size leading to a more precise segment boundary but increasing computation complexity. In one implementation, the training dataset generation tool 144 may set the window size between 10 and 20 pixels. A segment number parameter may control a number of segments. In one implementation, the training dataset generation tool 144 may set the segment number to be between 5 and 10 segments. A segmentation mode parameter may control whether a texture mode that considers greyscale or a natural mode that considers color (e.g., RGB color) is used. In one implementation, the training dataset generation tool 144 may set the segmentation mode parameter to natural mode.

Figure 3A:
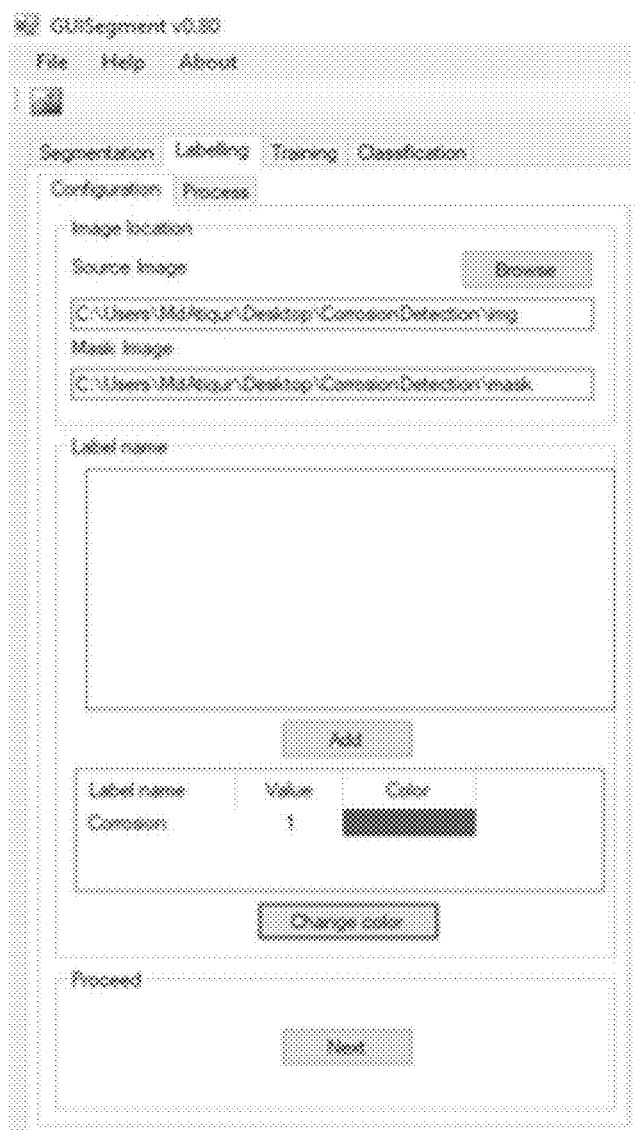
FIG. 3A is an example user interface in which a user may define class labels.
Figure 3B:
FIG. 3B is an example user interface in which a user may assign class labels to segments.

At step 174, the training dataset generation tool 144 prompts a user to manually label at least some of the segments of the first portion (e.g., the small portion) that were identified by the unsupervised image segmentation algorithm (e.g., FSEG algorithm) as corrosion segments to produce labeled images. Manually labeling may involve two steps. First, the user (e.g., engineer) may be prompted to define one or more class labels, for example, to define a corrosion segment label. FIG. 3A is an example user interface 310 in which a user may define class labels. Second, the user may be prompted to select an image and one or more segments in the image, and assign them one or more class labels to the selected segments. FIG. 3B is an example user interface 320 in which a user may assign class labels to segments. Such assignment may be repeated for each image in the first portion (e.g., the small portion) of the training dataset.

At step 176, the training dataset generation tool 144 uses the manually labeled images of the first portion (e.g., the small portion) of the training dataset as baseline ground truth to optimize classification rules (e.g., RGB color channel-based rules) to produce a rule-based classifier (e.g., a RGB color channel-based classifier). Parameters of the rule-based classifier (e.g., the RGB color channel-based classifier) may be optimized by minimizing misclassification of pixels in the labeled first portion (e.g., the small portion) of the training dataset. In one implementation, the classification rules (e.g., RGB color channel-based rules) may be optimized using a competent genetic algorithm-based optimization framework incorporated into, or operating alongside, the training dataset generation tool 144, for example, the Darwin Optimizer™ framework available from Bentley Systems, Incorporated.

In more detail, each pixel in an image (e.g., an RGB image) may be classified using values of one or more color indices, denoted $C_{idx}$, which may be a blue index, a green index, an excessive blue index, an excessive green index, an excessive red index, and/or a gray index. A RGB color channel-based classification rule may be given generally as:

$$\underline{C_{idx}} < C_{idx} < \overline{C_{idx}},$$

where $\underline{C_{idx}}$ and $\overline{C_{idx}}$ are the lower and upper bounds of the given color index, respectively. To classify a pixel as a corrosion or non-corrosion pixel, a relevant color index is selected with the corresponding upper and lower bounds. To produce the RGB color channel-based classifier, the upper and lower bounds may be optimized using a competent genetic algorithm-based optimization framework (e.g., the Darwin Optimizer™ framework), to search for a set of parameters that minimize the F1 score (i.e. a weighted average of precision and recall) for classification of pixels in the labeled first portion (e.g., the small portion) of the training dataset. In this manner, a rule-based classifier may be efficiently produced using only a small amount of labeled data.

Figure 4A:
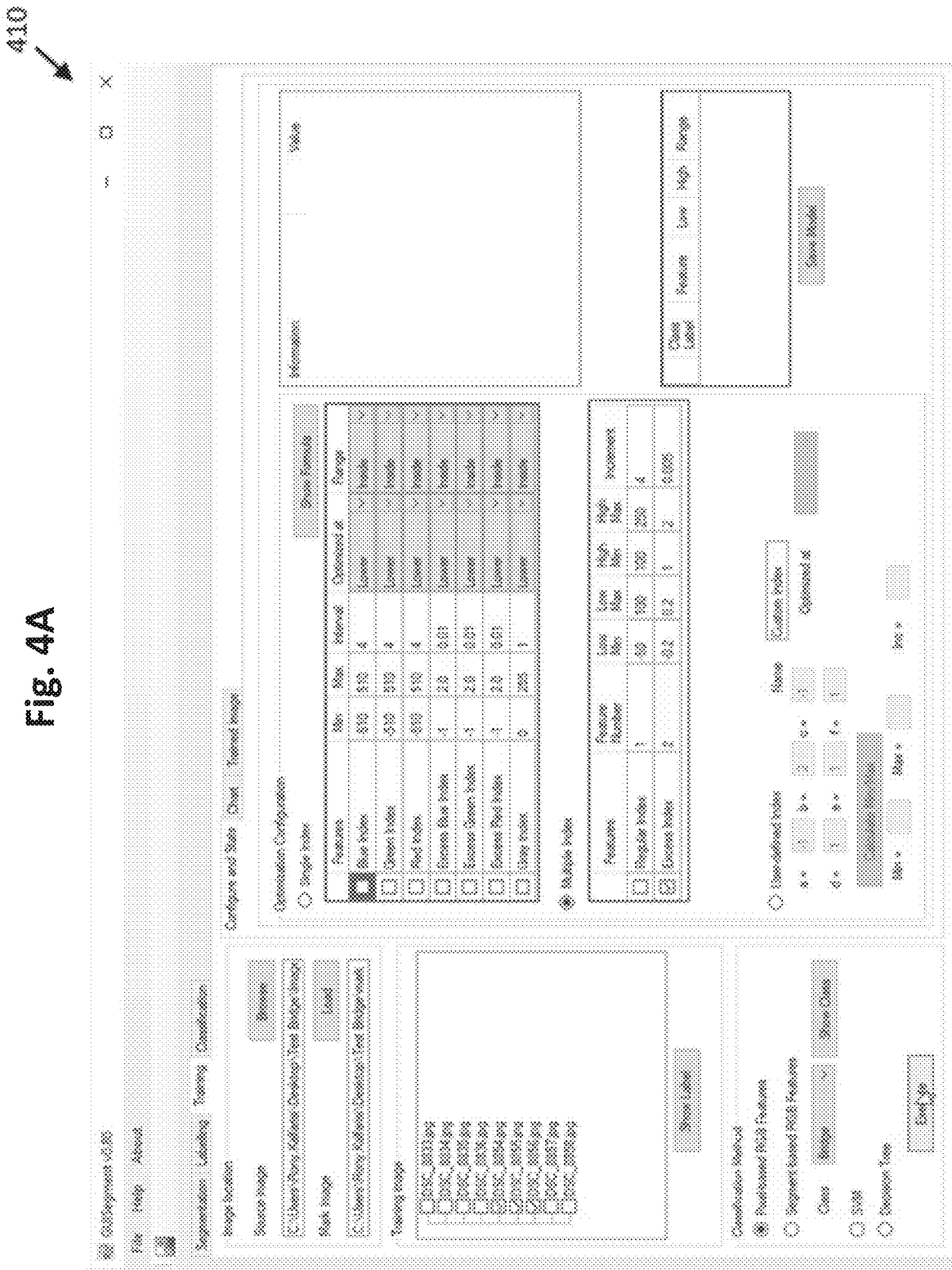
FIG. 4A is an example user interface in which a user may customize optimization of classification rule (e.g., RGB color channel-based rules) to produce a rule-based classifier (e.g., a RGB color channel-based classifier)

The training dataset generation tool 144 and the competent genetic algorithm-based optimization framework thereof may provide a user interface that allows a user (e.g., an engineer) to customize the optimization. FIG. 4A is an example user interface 410 in which a user may customize optimization of classification rules (e.g., RGB color channel-based rules) to produce a rule-based classifier (e.g., a RGB color channel-based classifier). The user may select a desired color index or indexes to consider from a predefine set of indices, or to specify custom indices. One example of a predefined index that may be selected is the excessive red index. The excessive red index (ERI) may be defined as:

$$ERI = \frac{2R - G - B}{R + G + B},$$

where R, B, and G are pixel values ranging from 0 to 255 for red, blue, and green color channels, respectively. One example of a user-specified customized color index (CCI) may be:

$$CCI = \frac{a \times R + b \times G + c \times B}{d \times R + e \times G + f \times B},$$

where $d \times R + e \times G + f \times B \neq 0$, R, B, and G are pixel values ranging from 0 to 255 for red, blue, and green color channels, respectively, and a, b, c, d, e, and f are coefficients that can be optimized or manual set by the user.

Figure 4B:
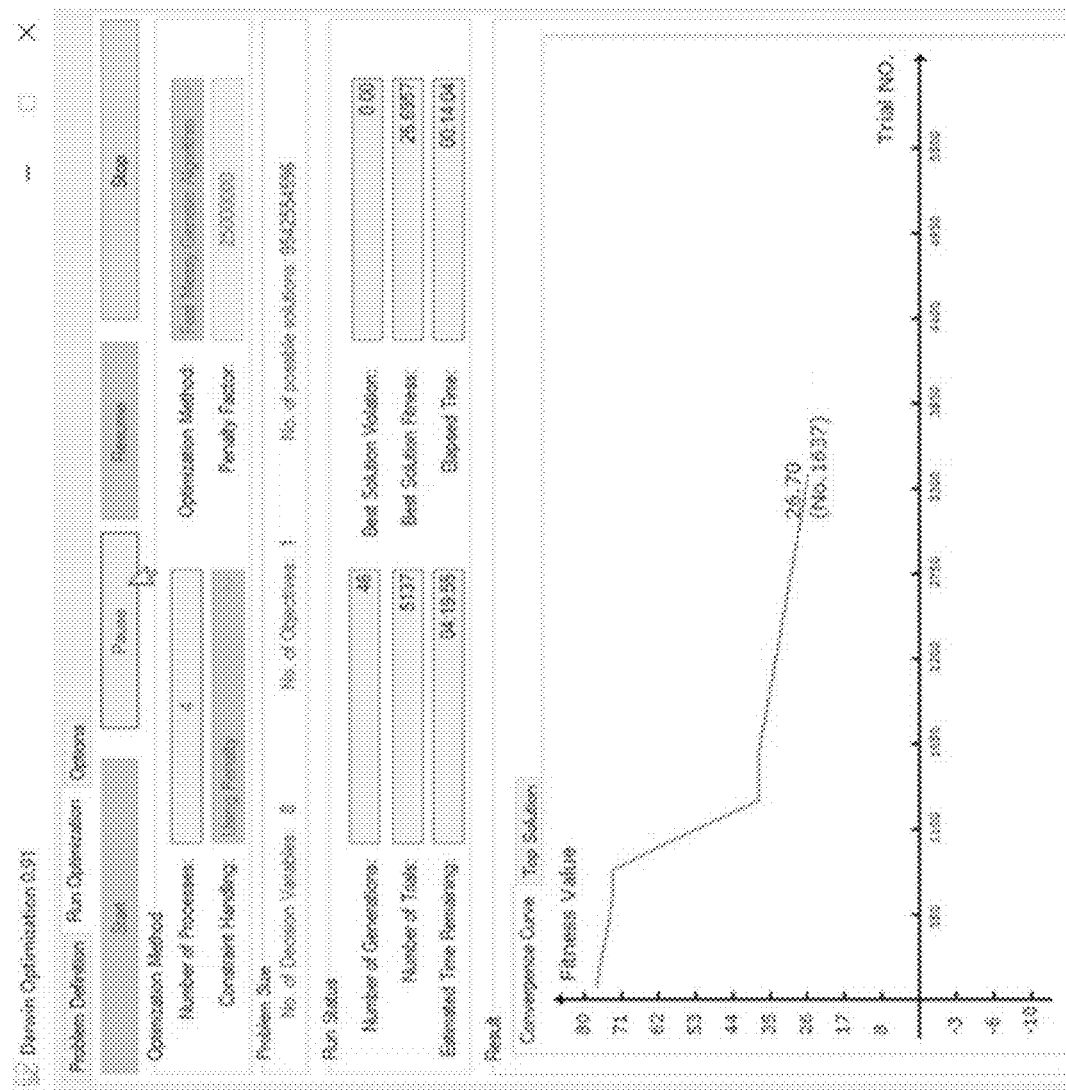
FIG. 4B is an example user interface in which a user may observe optimization of parameters of a rule-based classifier (e.g., a RGB color channel-based classifier) by a competent genetic algorithm-based optimization framework (e.g., a Darwin Optimizer™ framework)
Figure 5:
FIG. 5 is an example user interface in which a user may manage the application of a rule-based classifier (e.g., a RGB color channel-based classifier) to an image.

FIG. 4B is an example user interface 420 in which a user may observe optimization of parameters of the rule-based classifier (e.g., the RGB color channel-based classifier) by the competent genetic algorithm-based optimization framework (e.g., the Darwin Optimizer™ framework). After the optimization is complete, the optimized rules are saved as a classifier At step 178, the training dataset generation tool 144 applies the rule-based classifier (e.g., the RGB color channel-based classifier) to the second (e.g., large) portion of the images of the training dataset to automatically segment and label corrosion segments in the images of the second portion. FIG. 5 is an example user interface 500 in which a user may manage the application of a rule-based classifier (e.g., a RGB color channel-based classifier) to an image.

The resulting labeled training dataset may contain some misclassified results because the rule-based classifier (e.g., the RGB color channel-based classifier) may not always be perfect at classifying segments. To address this possible issue, in some implementations, a post-processing step (not shown in FIG. 1B) may be used to crop to correctly classified portions of images and/or remove misclassified images.

Figure 6A:
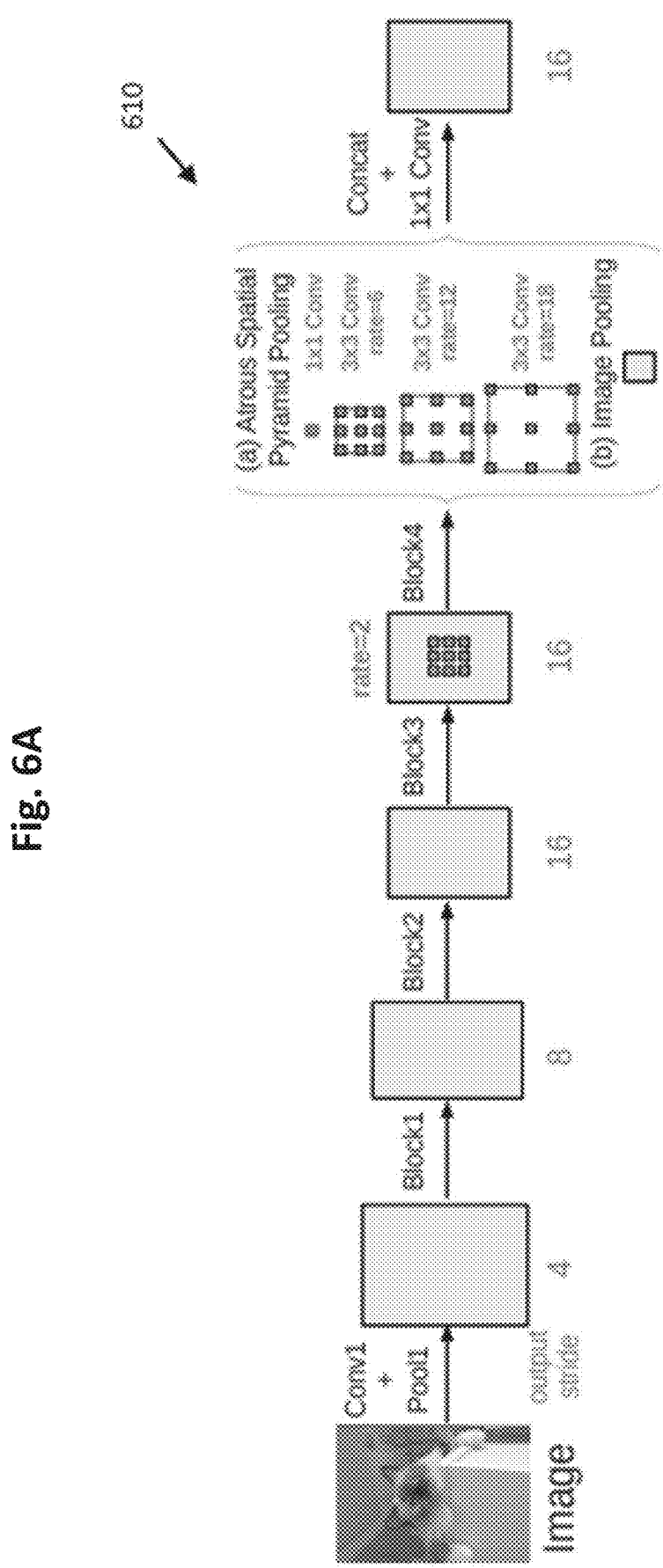
FIG. 6A is a diagram of an example DeepLab™ framework.

At step 180, the application 140 uses the labeled training dataset produced by the training dataset generation tool 144 to train a semantic deep learning model 142 to detect and segment corrosion in images of an input dataset. In some implementations, the application 140 may also use a portion of the labeled training dataset to validate the semantic deep learning model 142. The semantic deep learning model 142 may be a segmentation-enabled CNN model, for example, produced using a DeepLab™ framework. In traditional deep CNNs (DCNNs) the same image is scaled in different versions and features that perform well in terms of accuracy are aggerated, but with increased cost of computing. The DeepLab™ framework instead uses multiple parallel atrous convolution layers of the same input with different dilution rates. FIG. 6A is a diagram 610 of an example DeepLab™ framework. Parallel atrous convolution modules are grouped in atrous spatial pyramid pooling (ASPP), and 1×1 convolution and batch normalization are added in the ASPP. The outputs are concatenated and processed by another 1×1 convolution to create the final output with logits for each pixel.

Figure 6B:
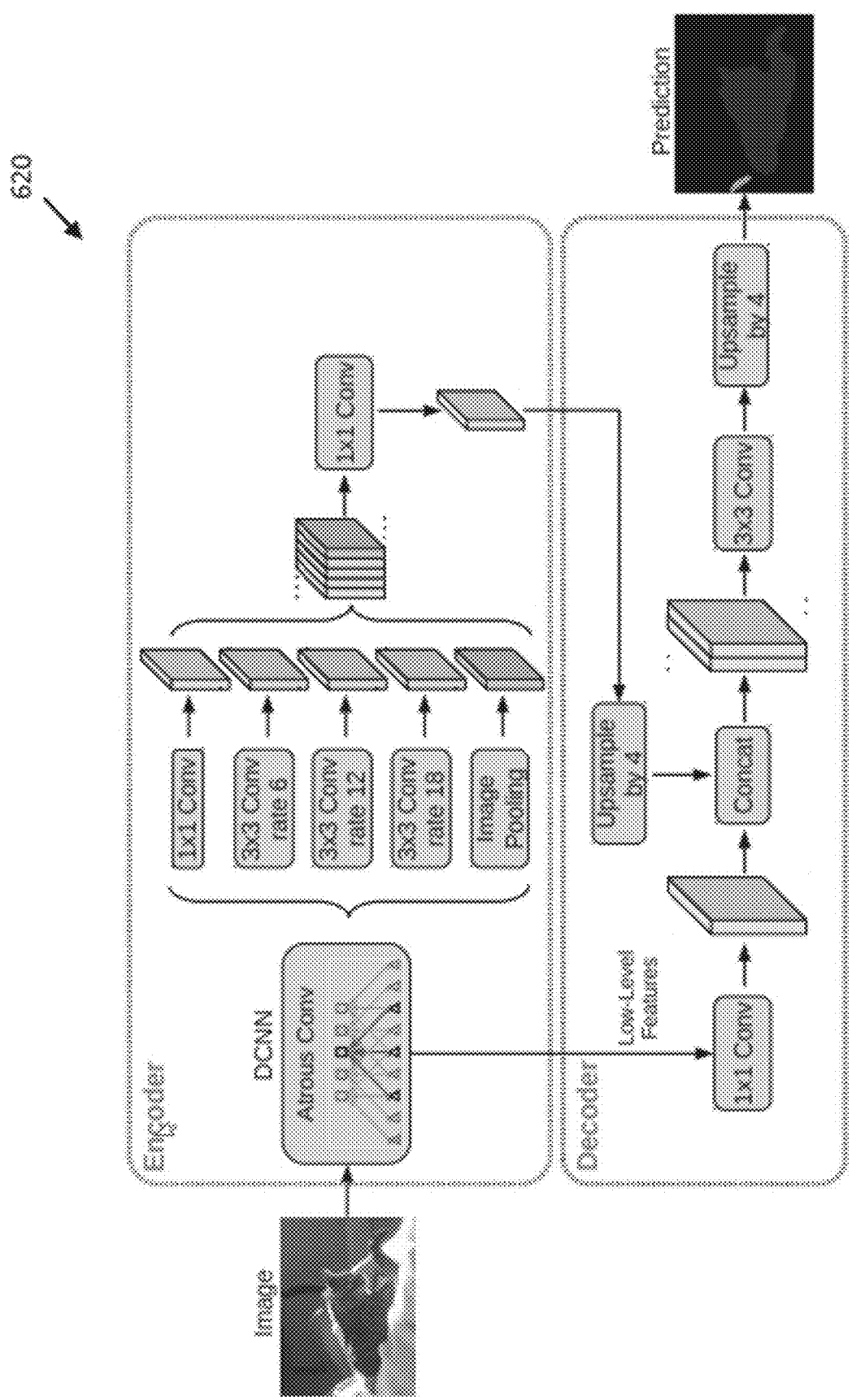
FIG. 6B is a diagram of an example DeepLab™ framework organized into an encoder-decoder structure.

The DeepLab™ framework may be organized into an encoder-decoder structure. FIG. 6B is a diagram 620 of an example DeepLab™ framework organized into an encoder-decoder structure. In general, and encoder-decoder structure contains an encoder module that gradually reduces feature maps and captures higher semantic information, and a decoder module that gradually recovers spatial information. The DeepLab™ framework may be applied as the encoder module and a decoder module added to obtain sharper segmentation. Outputs of the encoder backbone CNN may be processed by another 1×1 convolution of the decoder and concatenated to previous output. Feature maps may feed two 3×3 convolution layers, and the output up sampled to create the final segmented image.

The semantic deep learning model (e.g., segmentation-enabled CNN model) 142 may be trained by minimizing a total loss function that weights together misclassification of corrosion pixels and misclassification of non-corrosion pixels. An example loss function may be given as:

$$L_{total} = \frac{1}{N}\sum_{n=1}^{N} L_{cls}(n)$$

$$L_{cls}(n) = \frac{1}{K_{cls}}\Sigma_i - w_{ic} \times t_i \times \log p_i - (1 - t_i) \times \log(1 - p_i),$$

where N is the number of data batches for one training iteration, $L_{cls}(n)$ is a loss of data batch n for one training iteration, $K_{cls}$ is the number of classes (e.g., classes of corrosion and non-corrosion pixels), $p_i$ is predicted SoftMax probability of the $i^{th}$ pixel, $t_i$ is the ground truth label of pixel i and $w_{ic}$ is a loss weight of a class (e.g., corrosion or non-corrosion) to which pixel i belongs. In some implementations, misclassification of corrosion pixels may be weighted greater (e.g., using $w_{ic}$) than misclassification of non-corrosion pixels. This may be desired when the training data set includes more non-corrosion pixels than corrosion pixels, to prevent bias towards correctly classifying only the non-corrosion pixels.

Figure 7A:
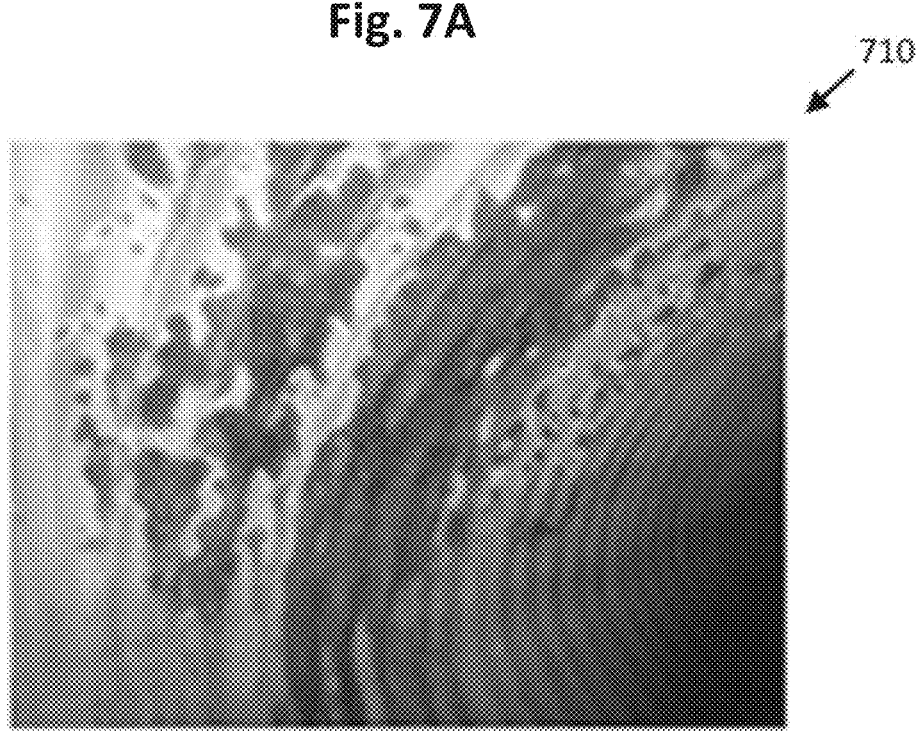
FIG. 7A is an example input image of an input dataset that includes surface corrosion.
Figure 7B:
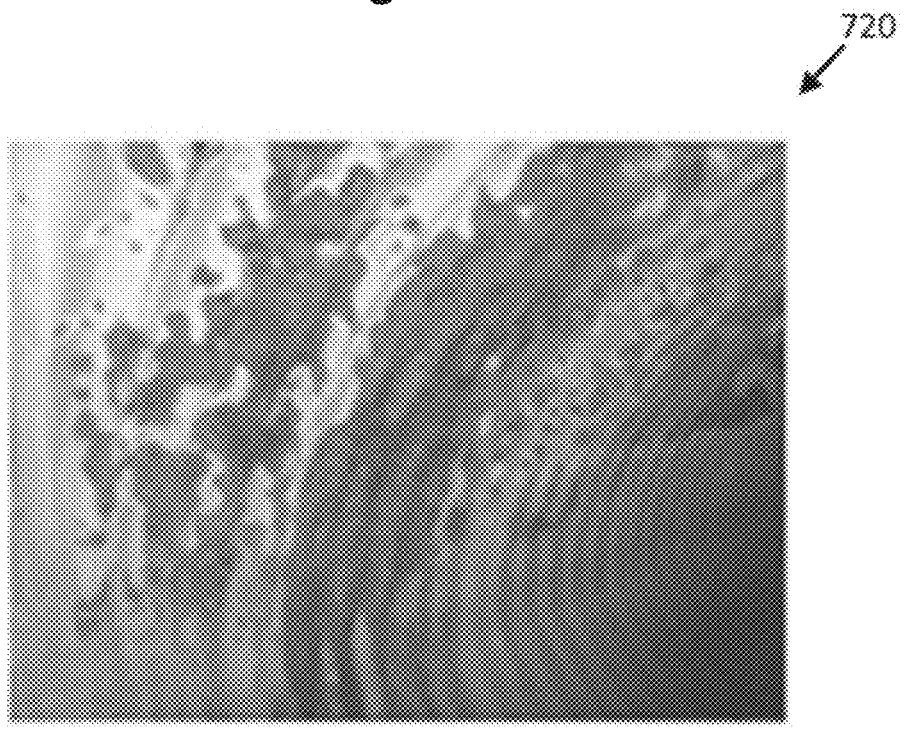
FIG. 7B is an example output image of an output dataset that may be produced by a semantic deep learning model from the input image.

Once trained, the semantic deep learning model (e.g., the segmentation-enabled CNN model) 142 may be used to detect surface corrosion in an input dataset of images (e.g., RGB digital photographs) of infrastructure. At step 182, the application 140 applies an input dataset to the trained semantic deep learning model 142, which produces therefrom a semantically segmented output dataset including images with labeled corrosion segments. Since segmentation is performed on the pixel level, the output dataset may identify irregular areas of corrosion, indicating corrosion at the pixel level as opposed to simply indicating regular bounding boxes (e.g., rectangles) around corrosion. FIG. 7A is an example input image 710 of an input dataset that includes surface corrosion. FIG. 7B is an example output image 720 of an output dataset that may be produced by the semantic deep learning model 142 from the input image 710. For purposes of illustration, a particular color/pattern is used here to indicate the detected corrosion. However, it should be understood that detected corrosion may be indicated in a variety of other manners, including using metadata that has no visual representation.

Figure 8:
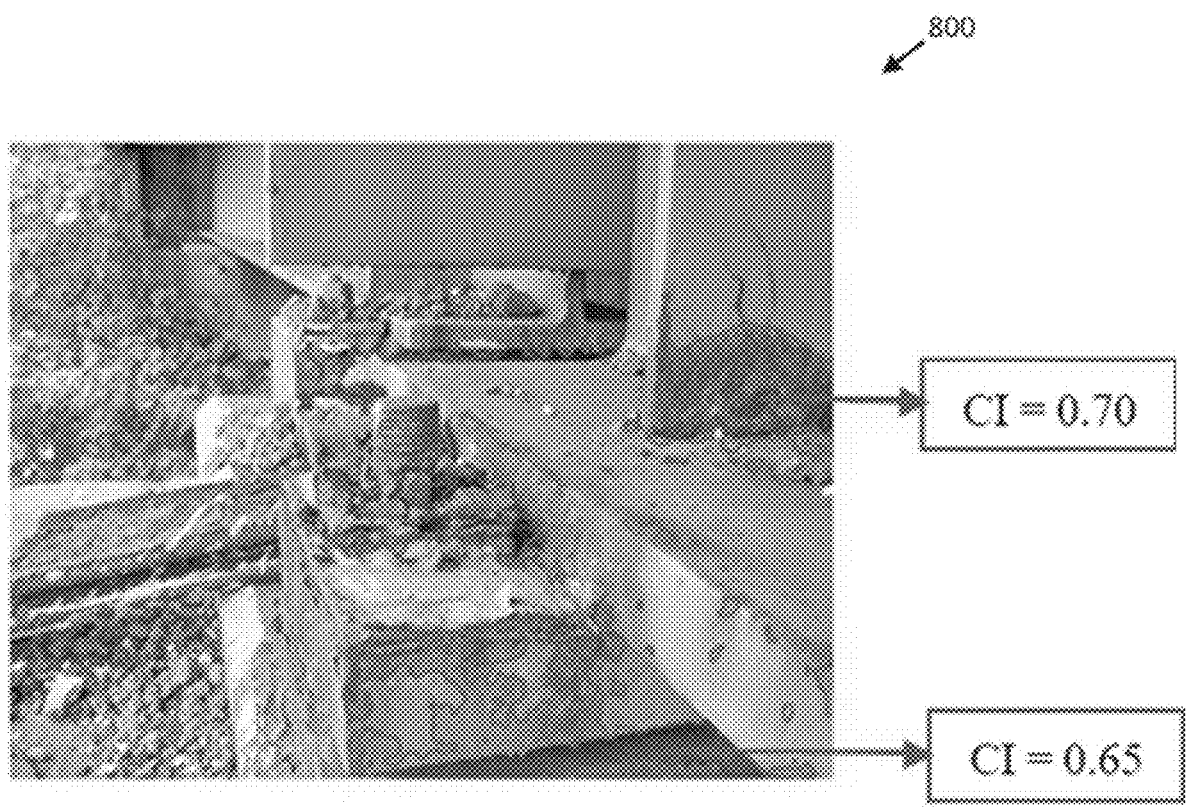
FIG. 8 is an example output image of an output dataset with corrosion segments associated with degree of corrosion indexes.

The labeled corrosion segments in the semantically segmented output dataset may be quantitatively evaluated to allow severity of the corrosion to be classified. At step 184, an evaluation tool 146 of the application 140 calculates a degree of corrosion index for each corrosion segment based on a mean grayscale value of pixels within its area. Gray color may be used since it correlates well with darkness of a pixel. Heavy corrosion is typically darker than light corrosion, such that the mean value in an area is typically a lower grayscale value for heavy corrosion and a higher grayscale value for lighter corrosion. In one implementation, a degree of corrosion index (CI) may be defined as:

$$CI = 1 - \frac{G}{255},$$

where G is the mean grayscale value. The evaluation tool 146 may use the corrosion index to divide corrosion segments into categories (e.g., light, medium and heavy corrosion categories) based on a comparison of the degree of corrosion index for the corrosion segment to one or more thresholds (e.g., maximum and/or minimum thresholds). In one implementation, a degree of corrosion index between 0 and 0.6 may be considered light corrosion, a degree of corrosion index between 0.6 and 0.75 may be considered medium corrosion and a degree of corrosion index between 0.75 and 1 may be considered heavy corrosion. FIG. 8 is an example output image 800 of an output dataset with corrosion segments associated with degree of corrosion indices.

At step 186, the application 140 provides (e.g., displays in its user interface to the user (e.g., the engineer), saves to memory/storage, etc.) indications of corrosion segments, their degree of corrosion index, their category and/or other information.

It should be understood that various adaptations and modifications may be readily made to what is described above to suit various implementations and environments. While it is discussed above that many aspects of the techniques may be implemented by specific software modules executing on hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for training and/or using a semantic deep learning model to detect surface corrosion, comprising:
   receiving, by a training dataset generation tool of an application executing on one or more computing devices, a training dataset that includes a plurality of images of infrastructure having at least some surface corrosion;
   applying, by the training dataset generation tool, an unsupervised image segmentation algorithm to segment a first portion of the images of the training dataset;
   prompting a user to manually label at least some of the segments of the first portion as corrosion segments to produce labeled images;
   optimizing, by the training dataset generation tool, classification rules based on the labeled images of the first portion to produce a rule-based classifier;
   applying, by the training dataset generation tool, the rule-based classifier to a second portion of the images of the training dataset to automatically segment and label at least some of the segments of the second portion as corrosion segments; and
   using the labeled training dataset to train the semantic deep learning model to detect and segment corrosion in images of an input dataset.

2. The method of claim 1, wherein the first portion includes a smaller number of images than the second portion.

3. The method of claim 1, wherein the unsupervised image segmentation algorithm is a factor-based texture segmentation (FSEG) algorithm.

4. The method of claim 1, wherein the plurality of images are red-green-blue (RGB) images, the classification rules are RGB color channel-based classification rules and the rule-based classifier is a RGB color channel-based classifier.

5. The method of claim 1, wherein the semantic deep learning model is a semantic segmentation-enabled convolutional neural network (CNN) model.

6. The method of claim 1, wherein the using the labeled training dataset to train the semantic deep learning model comprises:
   minimizing a total loss function of the semantic deep learning model that weights together misclassification of corrosion pixels and misclassification of non-corrosion pixels.

7. The method of claim 1, further comprising:
   applying an input dataset that includes a plurality of images of infrastructure to the trained semantic deep learning model to produce a semantically segmented output dataset, the semantically segmented output dataset including labeled corrosion segments.

8. The method of claim 7, further comprising:
   displaying, by the application, in a user interface or storing to memory/storage of the one or more computing devices, indications of the corrosion segments.

9. The method of claim 7, further comprising:
   calculating a degree of corrosion index for each corrosion segment based on a mean grayscale value of pixels within the corrosion segment's area.

10. The method of claim 9, further comprising:
    dividing, by the application, corrosion segments into categories based on a comparison of the degree of corrosion index of each corrosion segment to one or more thresholds.

11. The method of claim 10, further comprising:
displaying, by the application, in a user interface or storing to memory/storage of the one or more computing devices, at least one of the degree of corrosion index or the category of each corrosion segment.

12. A method for training and/or using a semantic deep learning model to detect surface corrosion, comprising:
training, by an application executing on one or more computing devices, the semantic deep learning model to detect and segment corrosion in images of an input dataset;
applying an input dataset that includes a plurality of images of infrastructure to the trained semantic deep learning model to produce a semantically segmented output dataset, the semantically segmented output dataset including labeled corrosion segments;
calculating a degree of corrosion index for each corrosion segment based on a mean grayscale value of pixels within the corrosion segment's area; and
displaying, by the application, in a user interface or storing to memory/storage of the one or more computing devices, the degree of corrosion index of each corrosion segment.

13. The method of claim 12, further comprising:
dividing, by the application, corrosion segments into categories based on a comparison of the degree of corrosion index of each corrosion segment to one or more thresholds.

14. The method of claim 13, further comprising:
displaying, by the application, in a user interface or storing to memory/storage of the one or more computing devices the category of each corrosion segment.

15. The method of claim 12, wherein the training further comprises:
receiving, by a training dataset generation tool of the application, a training dataset that includes a plurality of images of infrastructure having at least some surface corrosion;
applying, by the training dataset generation tool, an unsupervised image segmentation algorithm to segment a first portion of the images of the training dataset;
prompting a user to manually label at least some of the segments of the first portion as corrosion segments to produce labeled images;
optimizing, by the training dataset generation tool, classification rules based on the labeled images of the first portion to produce a rule-based classifier;
applying, by the training dataset generation tool, the rule-based classifier to a second portion of the images of the training dataset to automatically segment and label at least some of the segments of the second portion as corrosion segments; and
using the labeled training dataset to train the semantic deep learning model.

16. The method of claim 15, wherein the first portion includes a smaller number of images than the second portion.

17. The method of claim 15, wherein the unsupervised image segmentation algorithm is a factor-based texture segmentation (FSEG) algorithm, the plurality of images are red-green-blue (RGB) images, the classification rules are RGB color channel-based classification rules, the rule-based classifier is a RGB color channel-based classifier, and the semantic deep learning model is a semantic segmentation-enabled convolutional neural network (CNN) model.

18. A non-transitory electronic device readable medium having instructions stored thereon that when executed on one or more processors of one or more electronic devices are operable to:
receive a training dataset that includes a plurality of images of infrastructure having at least some surface corrosion;
apply an image segmentation algorithm to segment a first portion of the images of the training dataset;
receive user-provided labels for at least some of the segments of the first portion to produce labeled images;
optimize classification rules based on the labeled images of the first portion to produce a rule-based classifier;
apply the rule-based classifier to a second portion of the images of the training dataset to automatically segment and label at least some of the segments of the second portion; and
use the labeled training dataset to train a semantic deep learning model to detect and segment corrosion in images of an input dataset.

19. The non-transitory electronic device readable medium of claim 18, further comprising:
applying an input dataset that includes a plurality of images of infrastructure to the trained semantic deep learning model to produce a semantically segmented output dataset, the semantically segmented output dataset including labeled corrosion segments.

20. The non-transitory electronic device readable medium of claim 19, further comprising:
calculating a degree of corrosion index for each corrosion segment based on a mean grayscale value of pixels within the corrosion segment.

* * * * *